United States Patent [19]
Sansonetti et al.

[11] Patent Number: 5,737,106
[45] Date of Patent: Apr. 7, 1998

[54] WAVELENGTH SELECTIVE OPTICAL DELAY LINE

[75] Inventors: Pierre Sansonetti, Palaiseau; Jean-Michel Gabriagues, Asnieres; Isabelle Riant, Palaiseau, all of France

[73] Assignee: Alcatel N.V., Rijswijk, Netherlands

[21] Appl. No.: 540,449

[22] Filed: Oct. 10, 1995

[30] Foreign Application Priority Data

Oct. 11, 1994 [FR] France .................. 94 12113

[51] Int. Cl.[6] .................................. H04J 14/08
[52] U.S. Cl. .............................. 359/140; 359/123
[58] Field of Search .................... 359/140, 139, 359/137, 135, 123, 125; 370/375, 376

[56] References Cited

U.S. PATENT DOCUMENTS

| | | | |
|---|---|---|---|
| 4,566,889 | 1/1986 | Schmadel | 65/3.2 |
| 4,737,007 | 4/1988 | Alferness et al. | 385/96.19 |
| 4,874,216 | 10/1989 | Utaka et al. | 350/96.19 |
| 4,890,893 | 1/1990 | Smoot . | |
| 4,922,479 | 5/1990 | Su | 359/140 |
| 5,023,863 | 6/1991 | Masuda | 370/1 |
| 5,032,010 | 7/1991 | Su . | |
| 5,048,909 | 9/1991 | Henry et al. | 385/27 |
| 5,103,333 | 4/1992 | Koai | 359/140 |
| 5,115,428 | 5/1992 | Ramanan et al. | 359/140 |
| 5,142,660 | 8/1992 | Chang et al. | 385/10 |
| 5,369,515 | 11/1994 | Majima | 359/125 |
| 5,402,256 | 3/1995 | Spanle | 359/140 |
| 5,447,758 | 9/1995 | Snitzer | 385/30 |
| 5,459,801 | 10/1995 | Snitzer | 385/30 |
| 5,493,434 | 2/1996 | Sasayama et al. | 359/140 |
| 5,574,807 | 11/1996 | Snitzer | 385/24 |

FOREIGN PATENT DOCUMENTS

| | | |
|---|---|---|
| 0404587 | 12/1990 | European Pat. Off. . |
| 0618747A2 | 10/1994 | European Pat. Off. . |
| 1177001 | 7/1989 | Japan ......................... 385/87 |

OTHER PUBLICATIONS

*Patent Abstracts of Japan*, vol. 006 No. 145 (P–132), 4 Aug. 1982 & JP–A–57 066403 (Nippon Telegr & Telph Corp) 22 Apr. 1982.

*Patent Abstracts of Japan*, vol. 11, No. 147 (P–575), 14 May 1987 & JP–A–61 284706 (Hitachi) 15 Dec. 1986.

*Patent Abstracts of Japan*, vol. 5, No. 32 (P–50) (704) Feb. 27, 1981 corresponding to JP–A–55 155 303 (Ricoh).

*Patent Abstracts of Japan*, vol. 8, No. 286 (P–324) Dec. 27, 1984 corresponding to JP–A–59 149 304 (Nippon Denshin Denwa).

*Patent Abstracts of Japan*, vol. 6, No. 209 (P–150) Oct. 21, 1982 corresponding to JP–A–57 114 111 (Nippon Denshin Denwa).

*Primary Examiner*—Rafael Bacares
*Attorney, Agent, or Firm*—Sughrue, Mion, Zinn, Macpeak & Seas, PLLC

[57] ABSTRACT

An all-optical time slot interchange device comprises at least two wavelength selective delay lines disposed in series and each comprising a delay line for delaying the propagation of an optical signal by increasing the length of the optical path it travels. An optical signal at a given wavelength is extracted from a guide structure and re-injected into the guide structure via the delay line so as to apply a time-delay to the optical signal at a given wavelength. Applications include wavelength-division multiplexing optical telecommunication systems.

12 Claims, 3 Drawing Sheets

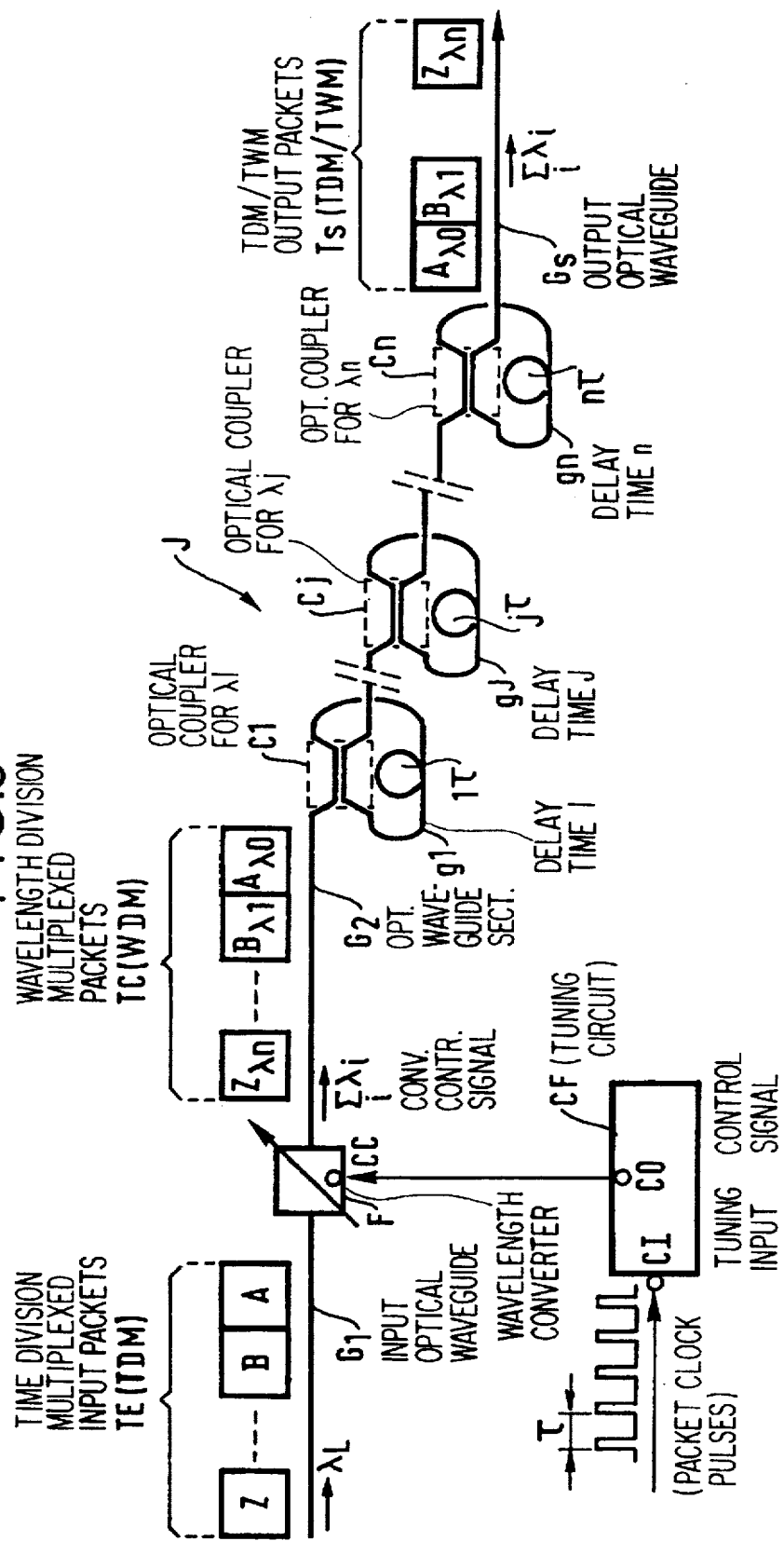

WAVELENGTH SELECTIVE OPTICAL DELAY LINE

BACKGROUND OF THE INVENTION

1. Field of the Invention

The invention concerns optical data transmission systems employing guide structures such as optical fibers and to be more precise systems using a plurality of wavelengths transmitted simultaneously over the same guide structure, such as wavelength-division multiplexing systems.

The invention concerns a wavelength selective delay line, i.e. a device intended to introduce a required time-delay into an optical signal having a given wavelength $\lambda_B$ without interfering with other wavelengths that may simultaneously be present in the same guide structure.

2. Description of the Prior Art

To illustrate the problem solved by the device of the invention, consider for example a wavelength-division multiplexed (WDM) asynchronous transfer mode (ATM) multichannel optical transmission system. In a WDM system of this kind, photonic signals are routed according to their wavelength; each destination is assigned a wavelength and any signal for that destination is modulated at the corresponding wavelength.

In this way, different signals having different destinations and therefore different wavelengths can travel simultaneously on a single guide structure without mutual interference.

However, some applications may require sequential processing of the data even if it is routed simultaneously to the processor device, in which case it can be desirable to establish or to modify the order in which packets at different wavelengths are received.

To achieve this it must be possible to introduce a time-delay into one or more signals, the other signals being propagated without any time-delay.

In the most general case, it is desirable to have means for introducing a time-delay of any value for each wavelength and for each signal, so that there is total freedom for arranging them in the time order required for the intended application.

In other words, the problem can be formulated as follows: to provide a "time slot interchange unit" for optical systems using time-division multiplexing of data packets, for example for all-optical routing of ATM cells in a high bit rate network.

In the prior art, the solution of this problem entails converting photonic signals into electronic signals, electronic processing of these signals and then their conversion back into optical signals after processing. A solution of this kind is costly and prohibitively complex.

An object of the invention is to alleviate the drawbacks of the prior art and the invention proposes an optical system for processing wavelength-division multiplexed optical signals in order to carry out time slot interchange.

SUMMARY OF THE INVENTION

To this end, the invention consists in an all-optical time slot interchange device comprising at least two wavelength selective delay lines disposed in series, each of said selective delay lines comprising:

a delay line for delaying the propagation of an optical signal by increasing the length of the optical path it travels, and extraction and re-injection means for extracting an optical signal at a given wavelength from a guide structure and re-injecting said optical signal at said given wavelength into said guide structure via said delay line so as to apply a time-delay to said optical signal at a given wavelength.

In one embodiment, the extraction and re-injection means are in the form of an optical coupler using a Bragg diffraction grating.

The diffraction grating is in a coupling region of the optical coupler, for example.

The delay line typically applies a time-delay characteristic of the duration of a pattern or a packet that is to be multiplexed.

Said at least two wavelength selective delay lines advantageously comprise respective delay lines that apply time-delays having respective durations equal to $j\tau$ for different wavelengths $\lambda_j$, where $j$ is an integer.

The invention further provides an all-optical wavelength-division multiplexing to time-division multiplexing converter comprising a time slot interchange device as defined hereinabove.

Other advantages and features of the invention will emerge from the following detailed description of a few embodiments and the appended drawings.

BRIEF DESCRIPTION OF THE DRAWINGS

FIG. 3 is a diagram showing one embodiment of the invention in a wavelength-division multiplexed packet time slot interchange application.

DETAILED DESCRIPTION OF THE PREFERRED EMBODIMENTS

The drawings show non-limiting embodiments of the invention to illustrate its theory and its implementation. The same reference symbols always identify the same components in all the figures.

Figure 1:
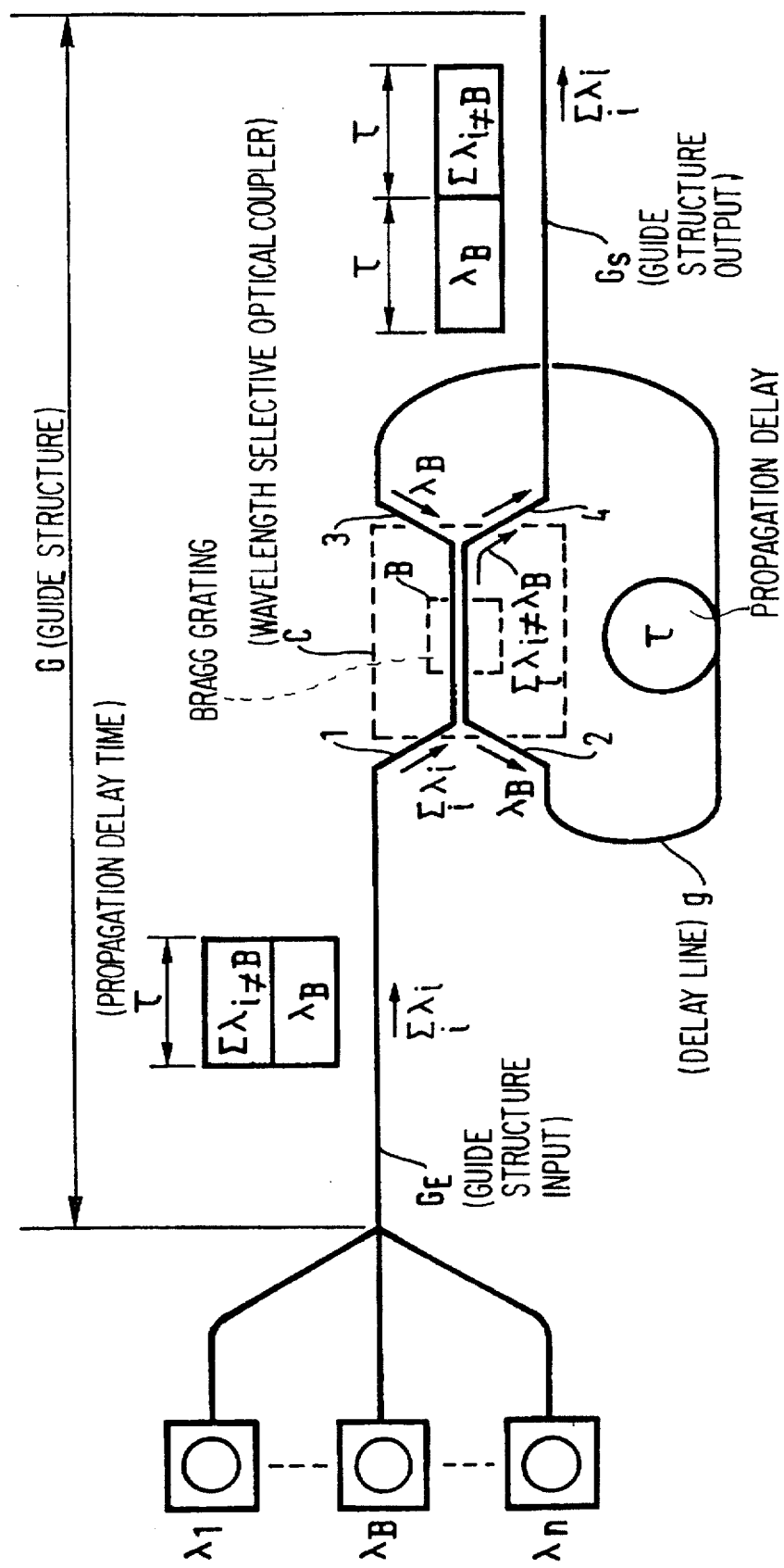
FIG. 1 is a diagram showing the various components required to implement the invention in order to illustrate the theory of its operation.

FIG. 1 is a schematic representation of the components required to implement the invention and illustrates its theory of operation.

The wavelength-division multiplexed signals propagate in the guide structure G which comprises an input part $G_E$ and an output part $G_S$. These signals can be generated in many ways; FIG. 1 shows a plurality of n sources tuned to different wavelengths $\lambda_1, \ldots, \lambda_B, \ldots, \lambda_n$, each wavelength conveying a different transmission channel $K_1, \ldots, K_B, \ldots, K_n$; all these channels are multiplexed and are present simultaneously in the guide structure G, which is an optical fiber or an optical waveguide, for example.

Consider transmission of data packets, for example. A standard ATM cell comprises 53 octets. At a bit rate of 10 Gbit/s, its duration is $\tau=42.4$ ns, which is equivalent to a fiber length $L=C\tau/n=8.77$ m. Thus an 8.77 m loop introduces a time-delay $\tau$ equal to an ATM packet.

The packets may be present simultaneously or not, depending on the volume of multiplexed data being transmitted at a given time.

Wavelength-division multiplexed transmission by all the wavelengths is shown. At any given time all the signals at all the wavelengths are present in the guide structure G:

$$\sum_{i=i}^{n} \lambda i = \left( \sum_{i} \lambda i \ne \lambda B \right) + \lambda B$$

The guide structure $G_E$ routes all of these signals to a wavelength selective optical coupler C. A coupler of this kind has four ports and these are numbered 1, 2, 3, 4 in the figure. Port 1 constitutes the input of the coupler C and the wavelength-division multiplexed signals $$\sum_{i} \lambda i$$

are routed by the guide structure $G_E$ to the input port 1 of the selective coupler.

The wavelength selective optical coupler is an optical component not yet available of the shelf.

Accordingly, the theory of its operation and one possible implementation method are described briefly hereinafter. Its implementation is merely one non-limiting example of how the present invention can be implemented. Any other implementation of a wavelength selective optical coupler can be used without departing from the scope of the invention.

The embodiment of a wavelength selective optical coupler described hereinafter is described in greater detail in another French patent application assigned to the same assignee as the present application and filed the same day (11 Oct. 1994) as the present application under application number 94/12112; the reader is invited to refer to that application if more details are needed.

For example, a wavelength selective optical coupler of this kind can be implemented using optical components available off the shelf by inserting two equivalent Bragg gratings into one arm of a Mach-Zendher interferometer which thereafter functions as a Michelson interferometer for the band centered on the wavelength $\lambda_B$ of the Bragg grating reflected by the Bragg grating B and as a Mach-Zendher interferometer outside this band.

A more elegant implementation of a wavelength selective coupler is characterized by the insertion of a Bragg grating which is reflective at the required wavelength $\lambda_B$ and transparent for any other wavelength in the coupling region of a 4-port. An optical coupler of this kind can be used to extract or to insert a signal having a wavelength $\lambda_B$ which corresponds to that reflected by the Bragg grating from or into a guide structure G able to convey a plurality of wavelength-division multiplexed signals $$\Sigma \lambda i.$$

In a preferred embodiment the optical coupler is a 100% coupler with virtually zero insertion loss (in the order of 0.1 dB/coupler). This optical coupler can be implemented in any way, for example using integrated opto-electronic techniques on a glass or silica semiconductor substrate, or by polishing or fusing and drawing optical fibers, all these methods being familiar to the person skilled in the art.

A Bragg grating is then formed in the coupling region of said coupler to make it a wavelength selective coupler.

The Bragg grating is transparent at any wavelength other than the wavelength $\lambda_B$ corresponding to the period of the grating. The Bragg grating B reflects only this wavelength $\lambda_B$.

In the absence of the Bragg grating B, all of the light $$\sum_{i} \lambda i$$

injected at the input port 1 would reach the output port 4, since this is a 100% coupler. However, the Bragg grating B is reflective at the wavelength $\lambda_B$, which is therefore reflected to port 2 rather than transmitted to output port 4. Apart from this wavelength $\lambda_B$, all of the remaining light $$\sum_{i} \lambda i - \lambda B$$

will be 100% coupled and transmitted to the output port 4. The wavelength selective coupler thus extracts a wavelength $\lambda_B$ from a spectrum $$\sum_{i} \lambda i$$

without interfering with the other wavelengths $$\sum_{i} \lambda i - \lambda B,$$

and theoretically this occurs without losses. The actual losses are in the order of 0.1 dB per coupler.

The Bragg grating can be implemented in any way, including the standard methods familiar to the person skilled in the art, for example by inducing a periodic variation in the refractive index by means of ultraviolet (UV) light operating locally on the population of optical fiber structure defects. These defects can be produced by doping, for example using the levels of Germanium used in small diameter (in the order of 1.40 μm, for example) fibers. In standard diameter (8 μm to 9 μm) fibers, a sufficient quantity of defects can be introduced by absorption of hydrogen, achieved by placing the device in an atmosphere of hydrogen at high pressure (200 to 300 bars) for a few weeks.

The wavelength selective optical coupler also inserts the signal having the wavelength $\lambda_B$ of the Bragg grating B in the following manner: remember that the spectrum of all other wavelengths $$\sum_{i} \lambda i - \lambda B$$

will be transmitted without losses from the main input port 1 to the output port 4 by the 100% coupler C because the Bragg grating B is transparent at these wavelengths. The signal at the wavelength $\lambda_B$ of the Bragg grating B is inserted by injecting said signal into the coupler C via port 3. Whence it is reflected by said Bragg grating B towards the output port 4 and thereby multiplexed into the spectrum of the signals $$\sum_{i} \lambda i - \lambda B$$

passing from the main input port 1 to the output port 4.

As shown in FIG. 1, it is sufficient to connect the extraction port 2 of the wavelength selective coupler C to one end of an optical delay line g having a physical length corresponding to a propagation time-delay τ (an optical fiber of a particular length, for example) and to connect the other end of said delay line g to the insertion port 3 of said wavelength selective coupler C, so that it constitutes a wavelength selective delay line.

Figure 2:
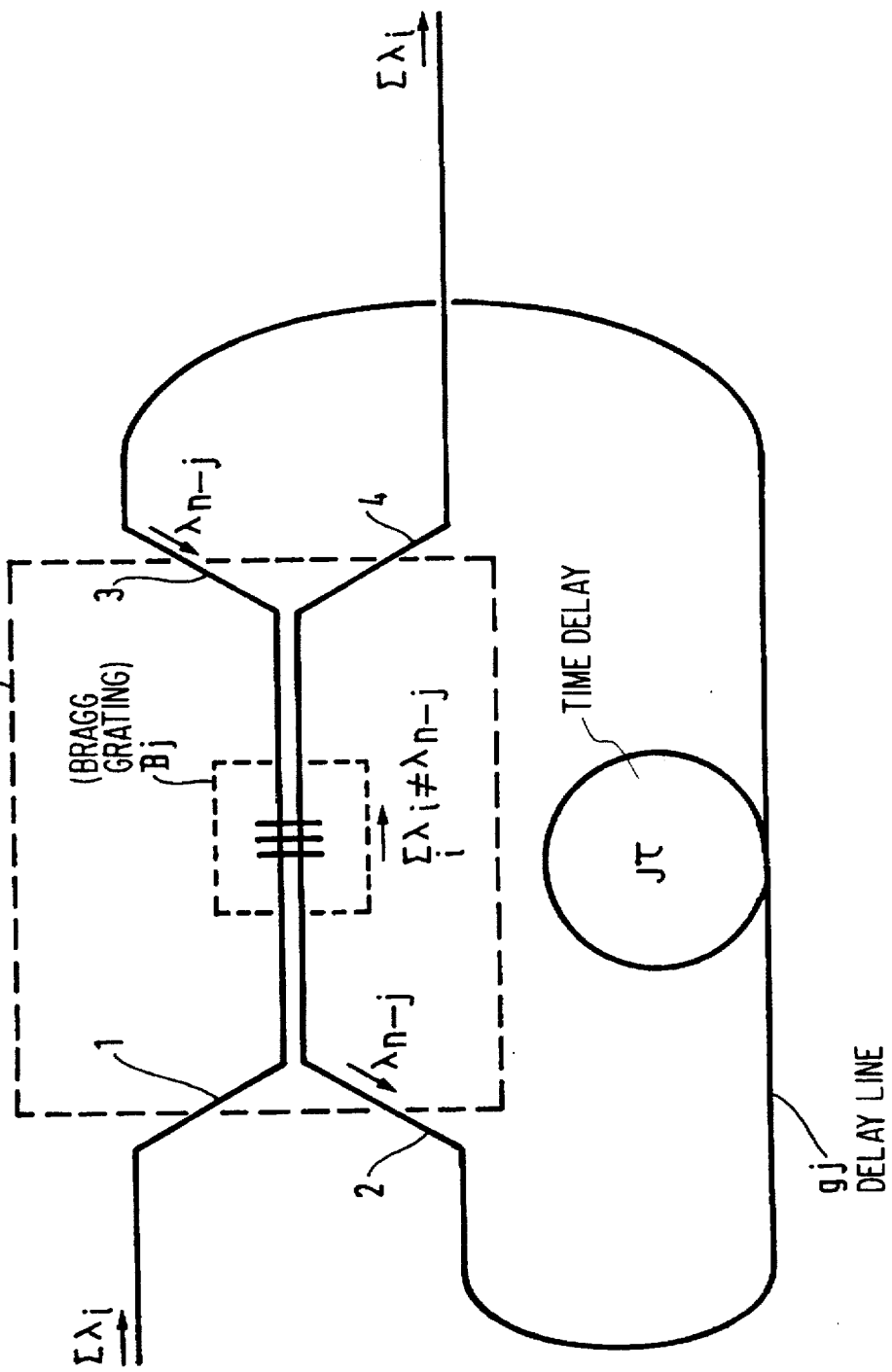
FIG. 2 is a diagram showing a basic loop of a wavelength selective delay line, together with its parameters, this line constituting one module in an illustrative application of the invention.

As shown diagrammatically in FIG. 1, the signal at the wavelength $\lambda_B$ of the Bragg grating B is delayed by a time-delay $\tau$ relative to the other multiplexed signals at other wavelengths $$\sum_i \lambda i - \lambda B$$

in the output guide structure $G_S$. The operation can be repeated as many times as necessary at the other wavelengths in order to obtain any required order for the packets of signals from the various sources tuned to $\lambda_i, \ldots, \lambda_B, \ldots, \lambda_n$. FIG. 2 shows one example.

FIG. 2 shows one example of a basic loop of a wavelength selective delay line, with its parameters, this loop providing a module for an illustrative application of the invention shown in FIG. 3.

The basic and parametered loop of a wavelength selective delay line of FIG. 2 can be generally described by describing an optical delay line that operates on a wavelength $\lambda_{n-j}$ which is one of n+1 different wavelengths $\lambda_i$, where i and j can take any integer value between 0 and n inclusive. The jth delay line introduces a time-delay of $j\tau$ only at the wavelength $\lambda_{n-j}$, the only wavelength reflected by the Bragg grating B, in the coupling region of the optical coupler Cj. This time-delay $j\tau$ is obtained by means of an optical waveguide or an optical fiber gj connected between the extraction output 2 and the insertion input 3 of the wavelength selective optical coupler Cj. The length of the guide gj is chosen to yield the time-delay $j\tau$ given the propagation speed c/n of light in the material of the waveguide: $L=j\tau c/n$.

The other wavelengths $$\sum_i \lambda i \neq \lambda n - j$$

are transmitted without delay or reflection or losses by the Bragg grating Bj between the main input 1 and the main output 4 of the wavelength selective coupler Cj.

Note that the value j=0 is included only to make the above explanation wholly general, since the value j=0 corresponds to a time-delay $j\tau=0$ for the wavelength $\lambda_{n-j}=\lambda_n$. This zero time-delay does not yield a physical delay line device selective at the wavelength $\lambda_n$.

FIG. 3 is a diagram showing one example of application of a wavelength selective delay line of the invention in an all-optical time slot interchange unit. Each wavelength selective delay line loop is as described above with reference to FIG. 2.

Optical data packets A, B, ..., Z are present in a stream of TDM packets $T_E$ on the input optical waveguide $G_1$ of the time slot interchange unit. The stream of packets is characterized by the order of the packets (A is the first, B is the second, Z is the last), the duration of each packet, denoted $\tau$ as in the FIG. 1 example, and the wavelength $\lambda_L$ of the optical signal of each packet, which is initially the same for all the packets in this example.

Wavelength-division multiplexing is applied in order to bring about time slot interchange of the packets. Each packet is assigned a specific wavelength $\lambda_i$ determined by the difference between its time position in the stream of TDM packets $T_E$ at the input $G_1$ and its time position in the stream of TDM/WDM packets Ts at the output $G_S$. This wavelength-division multiplexing can be effected in various ways, one example of which is shown in FIG. 3. A wavelength converter F can be tuned to any wavelength by a converter control signal CC supplied by the output CO of a tuning control circuit CF. The tuning circuit CF receives at its input CI a stream of packet clock pulses that are periodic with a duration $\tau$ between pulses. On each clock pulse the tuning circuit CF transmits a control signal CO to change the wavelength of the wavelength converter F.

Accordingly, the stream of TDM packets $T_E$ presented to the wavelength converter F by the first optical waveguide $G_1$ is converted into a stream of WDM packets $T_C$ on the second section of optical waveguide $G_2$. In this stream of packets, each packet (A, B, ..., Z) is associated with a respective signal wavelength $\lambda_0, \ldots, \lambda_1, \ldots, \lambda_n$. The stream of WDM packets $T_C$ is therefore wavelength-division multiplexed and transmitted by means of a spectrum of wavelengths $$\sum_i \lambda i$$

which constitutes the same number of transmission channels on the optical waveguide $G_2$.

The FIG. 3 optical time slot interchange unit is configured to reverse the time order of the data packets A, B ... Z which are presented in alphabetical order at the input of the time slot interchange unit on the optical waveguide $G_2$. This is achieved by applying a different optical time-delay to each packet in order to determine its new position in the stream of TDM/WDM output packets $T_S$ of the time slot interchange unit.

Each optical time-delay is provided by a wavelength selective optical delay line in accordance with the invention, as described hereinabove with reference to FIGS. 1 and 2. For n+1 packets, n delay lines are required operating at n respective different wavelengths to apply n different time-delays. In the FIG. 3 example there are 26 packets A, B, ..., Z so that n=25.

At the output end of the n wavelength selective delay lines connected in cascade (in series) and all constituted as described for the jth delay line hereinabove, the stream of TDM/WDM output packets $T_S$ on the output waveguide $G_S$ is obtained. The time order of the stream of TDM/WDM packets $T_S$ is the reverse order of that of the WDM stream $T_C$ presented to the input of the time slot interchange unit of the waveguide $G_2$. On the other hand, each packet (A, B, ..., Z) retains its own wavelength ($\lambda_0, \lambda_1, \ldots, \lambda_n$, respectively), which can continue to identify the corresponding transmission channel, for example for routing or source/destination identification purposes.

To avoid making the description too long, only the simplest possible example of time slot interchange has been described. However, it is equally possible to obtain any interchange of packets in a time slot interchange process that is less symmetrical than that described.

All that is required is to program the tuning control circuit CF to assign the wavelength corresponding to a given time-delay to the packet to be delayed by that time-delay. The necessary modifications are all in the programming (software) and require no physical modification of the device (hardware). Consequently, use of the time slot interchange unit described here yields extremely flexible results, virtually in real time.

The person skilled in the art can envisage other embodiments and applications of the invention without departing from the scope of the invention. For example, with an appropriate choice of parameters of an arrangement similar to that shown in FIG. 3 it is possible to effect all-optical conversion of time-division multiplexing (TDM) and vice versa.

There is claimed:

1. An all-optical time slot interchange device comprising:
   a guide structure including at least two wavelength selective delay lines disposed in series, each of said wavelength selective delay lines comprising:

a delay line for delaying the propagation of an input optical signal at a given wavelength, which represents given packet time slot within said optical signal, by increasing the length of the optical path said input optical signal at said given wavelength travels, and extraction and re-injection means for extracting said optical signal at said given wavelength from said guide structure and re-injecting said optical signal at said given wavelength into said guide structure via said delay line so as to apply a time-delay to said optical signal at said given wavelength such that said time delay produces an interchange of packet time slots within said input optical signal, which may then be output as a packet time-slot interchanged optical signal.

2. An all-optical time slot interchange device, comprising:

a guide structure including at least two wavelength selective delay lines disposed in series, each of said selective delay lines comprising:

a delay line for delaying the propagation of an optical signal by increasing the length of the optical path it travels, and extraction and re-injection means, wherein said extraction and re-injection means comprise a Bragg diffraction grating type optical coupler, for extracting an optical signal at a given wavelength from said guide structure and re-injecting said optical signal at said given wavelength into said guide structure via said delay line so as to apply a time-delay to said optical signal at a given wavelength.

3. Time slot interchange device according to claim 2 wherein said diffraction grating is in a coupling region of said optical coupler.

4. Time slot interchange device according to claim 1 wherein said delay line applies a time-delay that is characteristic of the duration of a pattern or a packet to be multiplexed.

5. An all-optical time slot interchange device comprising:

a guide structure including at least two wavelength selective delay lines disposed in series, each of said selective delay lines comprising:

a delay line for delaying the propagation of an optical signal by increasing the length of the optical path it travels, and extraction and re-injection means for extracting an optical signal at a given wavelength from said guide structure and re-injecting said optical signal at said given wavelength into said guide structure via said delay line so as to apply a time-delay to said optical signal at a given wavelength wherein said at least two wavelength selective delay lines comprise respective delay lines that apply time-delays having respective durations equal to $j\tau$ for different wavelengths $\lambda_j$ where j is an integer and $\tau$ equals the duration of a packet transmission.

6. A time slot interchange device according to claim 5, wherein said extraction and re-injection means comprise a Bragg diffraction grating type optical coupler.

7. A time slot interchange device according to claim 2, wherein said at least two wavelength selective delay lines comprise respective delay lines that apply time-delays having respective durations equal to $j\tau$ for different wavelengths $\lambda_j$ where j is an integer and $\tau$ equals the duration of a packet transmission.

8. A time slot interchange device according to claim 1, wherein said extraction and re-injection means comprise a Bragg diffraction grating type optical coupler.

9. A time slot interchange device according to claim 1, wherein said at least two wavelength selective delay lines comprise respective delay lines that apply time-delays having respective durations equal to $j\tau$ for different wavelengths $\lambda_j$ where j is an integer and $\tau$ equals the duration of a packet transmission.

10. A time slot interchange device according to claim 9, wherein said diffraction grating is in a coupling region of said optical coupler.

11. A time slot interchange device according to claim 7, wherein said diffraction grating is in a coupling region of said optical coupler.

12. An all optical wavelength-division multiplexer to time-division multiplexing converter comprising:

an all-optical time slot interchange device which comprises:

a guide structure including at least two wavelength selective delay lines disposed in series, each of said wavelength selective delay lines comprising:

a delay line for delaying the propagation of an input optical signal at a given wavelength, which represents a given packet time slot within said optical signal, by increasing the length of the optical path said input optical signal at said given wavelength travels, and extraction and re-injection means for extracting said optical signal at said given wavelength from said guide structure and re-injecting said optical signal at said given wavelength into said guide structure via said delay line so as to apply a time-delay to said optical signal at said given wavelength such that said time delay produces an interchange of packet time slots within said input optical signal, which may then be output as a packet time-slot interchanged optical signal.

* * * * *